March 30, 1965 G. T. RANDOL 3,175,471
HYDRAULICALLY-OPERATED BRAKE BOOSTER MECHANISM
Filed May 24, 1963 5 Sheets-Sheet 1

Inventor

March 30, 1965  G. T. RANDOL  3,175,471
HYDRAULICALLY-OPERATED BRAKE BOOSTER MECHANISM
Filed May 24, 1963  5 Sheets-Sheet 2
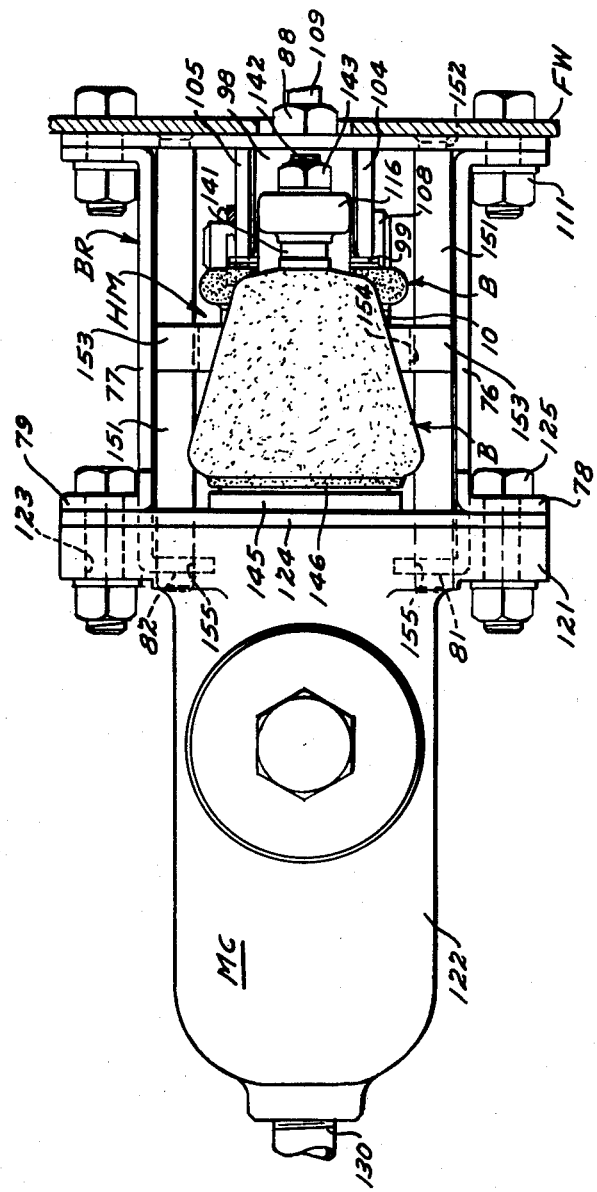
FIG.2
Inventor

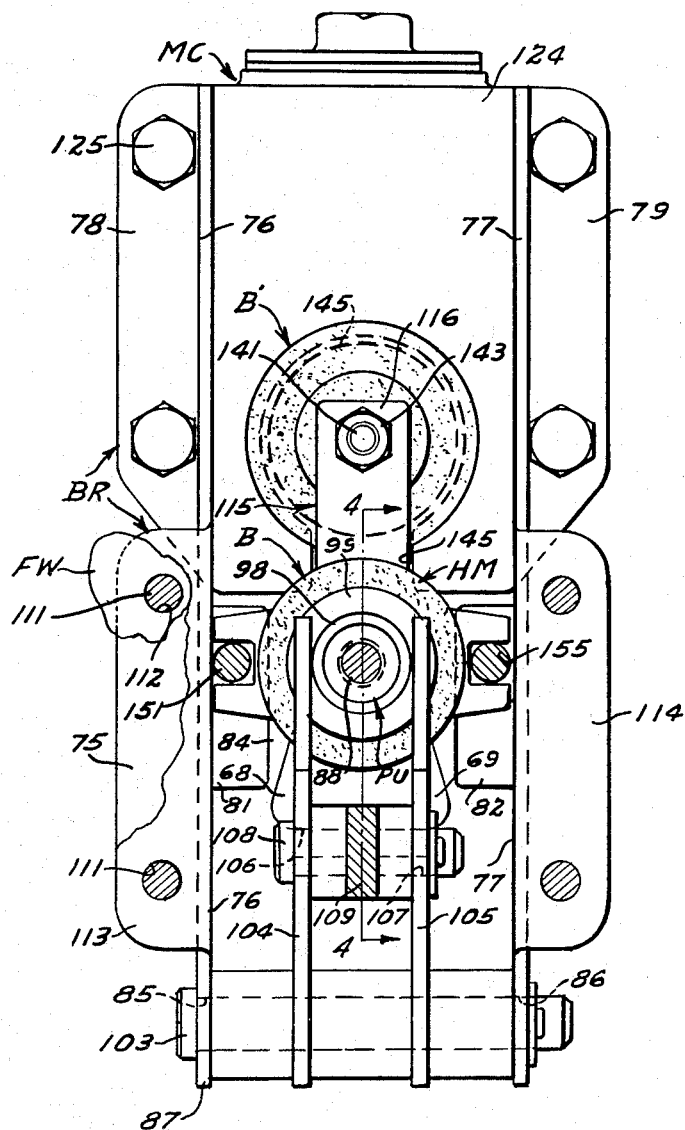

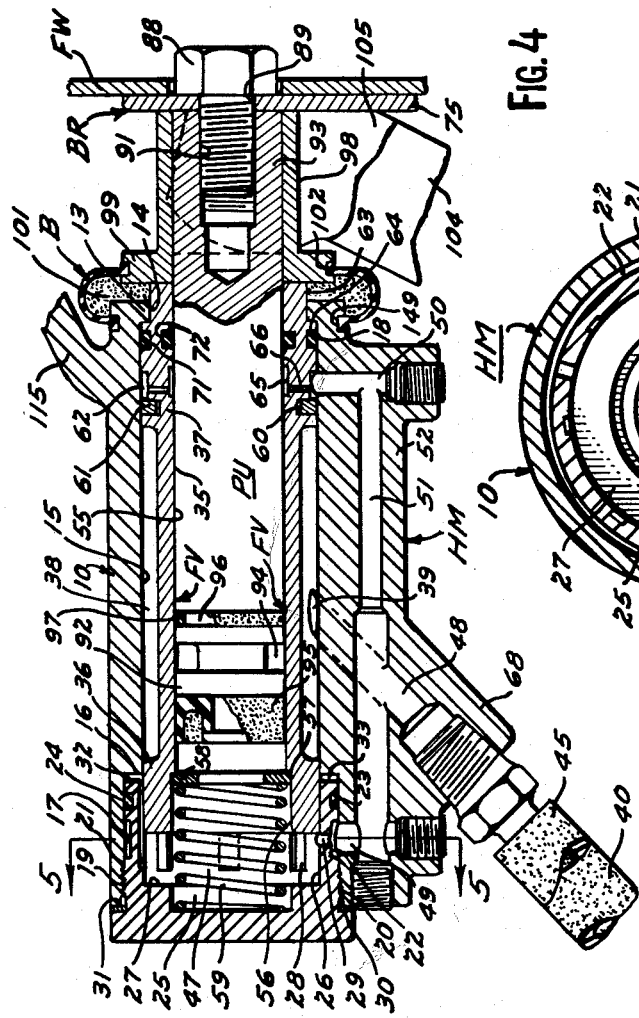

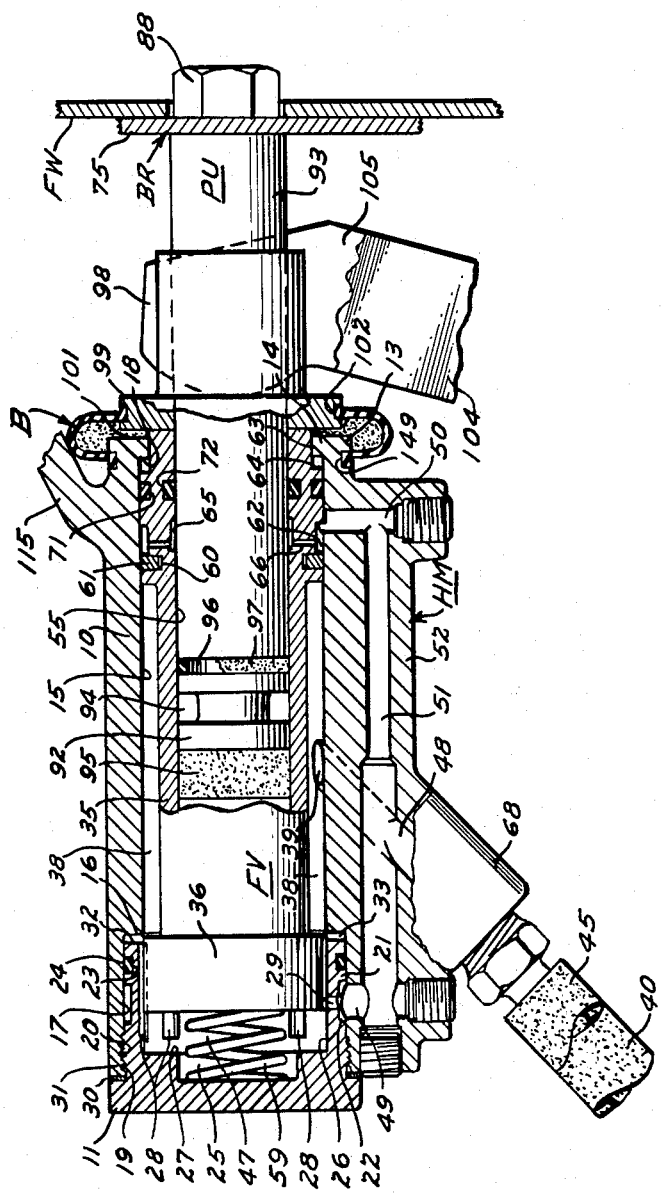

United States Patent Office 3,175,471
Patented Mar. 30, 1965

3,175,471
HYDRAULICALLY-OPERATED BRAKE BOOSTER MECHANISM
Glenn T. Randol, 3 E. 2nd Ave., Loch Lynn,
P.O. Box 275, Mountain Lake Park, Md.
Filed May 24, 1963, Ser. No. 283,082
5 Claims. (Cl. 91—216)

This invention relates to a power unit for hydraulic brakes adapted to provide the major portion of the operating force to apply the brakes on automotive vehicles and the like, said invention having particular reference to a hydraulically-operated brake mechanism of the booster-type which includes a novel and improved hydraulic booster motor operable from a source of static hydraulic pressure such as an accumulator by pressure derived from a fluid circulating pump.

A primary object of the invention is to provide an improved power unit for use in automotive hydraulic brake systems wherein the power unit and the master cylinder are arranged as a unitary structure on an interposed support assembly with the hydraulic displacement parts thereof in partially overlapping relationship for compactness.

Another object of the invention is to provide a novel and improved hydraulic motor for an automotive hydraulic brake system that incorporates a movable power cylinder closed at one end and open at the other; a fixed piston projecting into said power cylinder to define a variable power chamber between the closed end of the cylinder and confronting end of said piston projecting therein; a cylindrical sleeve-type control valve slidably disposed between the inner cylindrical surface of the wall of the power cylinder and the outer cylindrical surface of said piston to define an annular pressure chamber between said wall and valve sleeve, said valve chamber having continuous communication with said source of hydraulic pressure for selective connection with said variable power chamber in the hydraulic motor and a return circuit, to control operative energization thereof; means on the valve sleeve exposed to proportional hydraulic pressure in effect in said power chamber to provide reaction "feel" which is relayed to an operator-operated member (brake-pedal) adapted to actuate said valve sleeve from normally released position; a normally preloaded spring operably disposed in said power chamber to react between the closed end of said cylinder and the valve sleeve to oppose relative displacement thereof from said position; and an induction and excursion system of fluid passageways incorporated in said valve sleeve and power cylinder for conveying pressurized fluid from the chamber in the valve sleeve for admission to said power chamber, and for returning such fluid when deactivated and any seepage to a sump or reservoir for recirculation to the said valve sleeve.

Another object of the invention is to utilize the said stationary piston in a novel manner with supplementary supporting means lying outside of said hydraulic cylinder in parallel relationship thereto, to prevent angulation of said cylinder from a straight-line path of movement thereby insuring that such movement is maintained coaxial with respect to the axis of said piston and parallel to the axis of said supplementary means, said means being rigid with the support assembly aforesaid disclosed herein as a mounting bracket.

Another feature of the invention is to utilize the brake master cylinder piston return spring and subsequently developed pressure on the fluid therein, to oppose the said valve spring disposed in the power chamber of said hydraulic motor whereby operator force exerted on said valve sleeve via said operator member initially effects simultaneous operation of said valve sleeve, power cylinder and master cylinder piston depending on the relative strength of the two springs aforesaid. In the event the master cylinder piston is simultaneously operated under influence of the initial operator force on the brake-pedal, the master cylinder will be conditioned to pressurize the fluid therein prior to operative energization of the hydraulic motor; while, if the sleeve valve alone is moved relatively to the stationary piston and power cylinder as a consequence of a lighter valve spring, initial energization of the hydraulic motor will condition the master cylinder to pressurize the fluid.

A further advantage provided by the present invention is its novel utilization of circulating fluid pressure from the power steering pump in motor vehicles so equipped, such fluid pressure being of high pressure intensity enabling use of a relatively small power chamber and therefore power cylinder with corresponding reduction in the sizes of the operating parts comprising said motor to produce an unusually compact booster assembly to facilitate installation of the vehicle.

Additional objects and advantages of the present invention will be apparent from the following description, reference being had to the accompanying drawings wherein a preferred embodiment of the invention is exemplarity illustrated.

FIGURE 1 is a side elevation of my novel hydraulic booster mechanism constructed in accordance with the present invention, and which is exemplarity shown schematically connected to operate the master cylinder in part of a hydraulic brake system such as employed on automotive vehicles and the like, operation of said mechanism being effected by a conventional hydraulic pressure-producing system also illustrated schematically in this figure wherein the vehicle brakes are "off";

FIGURE 2 is a top plan view of FIGURE 1 on an enlarged scale;

FIGURE 3 is a rear sectional view taken on an enlarged scale along the line 3—3 of FIGURE 1;

FIGURE 4 is a longitudinal vertical section of the hydraulic booster motor per se taken along the line 4—4 of FIGURE 3;

FIGURE 5 is a cross-section taken along the line 5—5 of FIGURE 4 showing particulars of the porting associated with the power chamber and the fluid return passage system incorporated in said motor;

Figure 1:
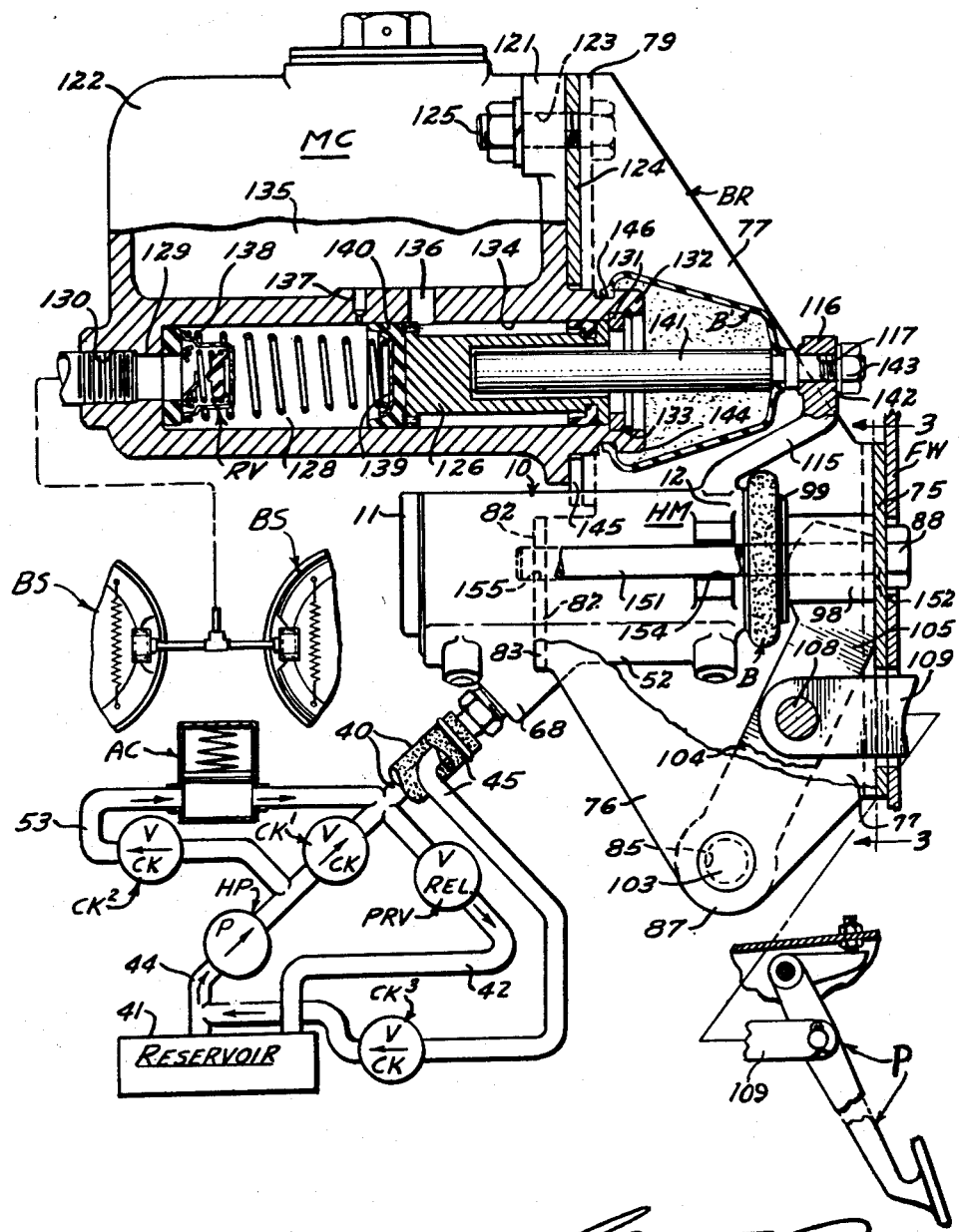

FIGURE 6 is a front elevation of the hydraulic booster motor showing the arrangement of the two exterior conduits which control incursion and excursion of fluid with respect to the motor power chamber; and FIGURE 7 is a sectional view similar to FIGURE 4 but showing the operating parts in relatively adjusted positions corresponding to motor energized condition to pressurize the fluid in the brake master cylinder.

Referring now to the drawing, the character "HM" generally designates a hydraulic booster motor comprising a movable power cylinder 10 which is preferably a cast cylinder or casing. The cylinder is closed at its front (left) end by a threaded closure head 11, and open at its rear (right) end 12. The open end 12 of the cylinder is formed with an inturned annular flange 13 having a central opening 14 therethrough. The interior of the power cylinder 10 is provided with a longitudinal bore 15 co-extensive with an internal annular shoulder at 16 forming the juncture with a counterbore 17 terminating at the forward end of said cylinder, and the inner face 18 of said inturned flange 13. The threaded closure head 11 is provided with a reduced diameter externally threaded portion 19 which engages complemental internal threads 20 adjacent the terminus of said counterbore, and a smooth diameter portion 21 extending inwardly from said threaded portions, fits in close tolerance relation into the surface portion of said counterbore, said smooth portion 21 being formed with two longitudinally spaced circular grooves 22, 23, respectively, the latter groove receiving a packing 24 to insure fluid-tight sealed relation between the counterbore and said smooth portion on the closure head 11. The interior of said closure head 11 being formed with a circular recess 25 and a counterbore 26 terminating the inner end of said head, juncture between said recess and last-named counterbore providing an internal annular abutment shoulder 27. The longitudinal bore and counterbore 15, 26, respectively, are formed with identical diameters with the counterbore 26 being provided with a plurality of longitudinal circumferentially spaced surface channels 28, said channels being closed at their forward ends in spaced relation to said shoulder 27. A plurality of radial passageways 29 is provided through the wall of the smooth diameter portion 21 of the closure head 11 to interconnect the interior of the latter counterbore with said circular groove 22. The said closure head 11 impinges an annular gasket 30 against the front (left) end 31 of the power cylinder wall to make the front end thereof fluid-tight, and wherein the inner end 32 of the smooth diameter portion 21 is predeterminately spaced from the shoulder 16 to provide an internal annular control channel 33 therebetween which continuously communicates with said surface channels 28.

Slidably disposed in the longitudinal bore 15 and an interior portion of the counterbore 26, is a cylindrical valve element disclosed herein as a tubular member or sleeve 35 comprising a forward circular working land 36 which normally overlies the control channel 33, and a longitudinally spaced fluid-retaining land or flange 37, said land and flange defining an annular variable pressure chamber 38 which continuously communicates with a source of hydraulic pressure. The interaction of said sleeve, land and channel produce a follow-up control valve generally designated "FV" for controlling the motor HM.

The chamber 38 is provided with a hydraulic inlet passage 39 preferably connected to a flexible conduit 40 (see FIGURE 1) leading from the outlet side of a circular pump generally designated "HP" which exemplarily illustrates the source of hydraulic pressure production. A check-valve CK$^1$ is interposed in the conduit 40 ahead of the outlet side of said pump to prevent back-pressure reaction from chamber 38 and possible fluid flow via said pump when idle. Interconnecting the conduit 40 and a fluid supply reservoir 41 is a shunt pressure line 42 in which is interposed a spring-loaded pressure regulator valve shown at "PRV" which functions to return to the reservoir (sump) any excess fluid above that required to operate the power cylinder 10 thereby maintaining a substantially maximum pressure condition in the chamber 30. The inlet side of this pump is connected to a conduit 44 leading from the reservoir to which the hydraulic fluid is returned from the motor HM through a flexible conduit 45 in a manner to be described. The pump HP obviously functions to supply a constant flow of hydraulic fluid to the chamber 38, and under control of said novel valve mechanism FV, the fluid being displaced under pressure into a variable volume power chamber 47 within the booster motor HM to activate the same, and thence outwardly thereof through an outlet passage 48 to the return conduit 45 during inactivated status of said motor wherein the fluid in chamber 38 is isolated from that in the power chamber 47. The annular groove 22 in the closure head 11 aforesaid, is connected to a pair of longitudinally spaced outlet ports 49, 50 through the wall of the power cylinder 10, which ports are interconnected by a horizontal passage 51 provided in an embossment 52 integral with the exterior of the power cylinder casing, and substantially coextensive therewith. Optionally, an accumulator designated as a whole "AC" may be interposed in the conduit 40 by using another shunt pressure line 53 in which another spring-loaded check-valve CK$^2$ is interposed ahead of the pump HP to block return flow to the accumulator, the latter serving to store static fluid under pressure supplied by said pump, to energize said booster motor HM during operation of said pump or for a limited period when the latter is idle. A third spring-loaded check-valve CK$^3$ is interposed in the return conduit 45 to maintain a predetermined minimal non-activating pressure in chamber 47 during inactivated status of the motor HM to prevent cavitation therein, which if permitted, would delay energization attended by initial erratic operation of the motor since the chamber 47 would first have to be filled before fluid therein could be pressurized to activate the motor.

The valve sleeve 35 is also provided with a longitudinal bore 55 which terminates at its forward end into a counterbore 56 to provide therebetween an internal circular shoulder 57 against which the peripheral surface on one side of a thrust washer 58 bears. A normally preloaded spring 59 is operably disposed between the bottom of recess 25 in the closure head 11 and said thrust washer to react between said closure head and said valve sleeve to oppose relative displacement of the latter from normal "off" position wherein said hydraulic motor HM is inactivated, to operating "on" position wherein said motor is activated. Longitudinally spaced rearwardly from said annular valve chamber on the fluid-retaining flange, is a circular groove 60 adapted to receive an expansible sealing member such as a piston ring 61, said ring groove extending to the right of said ring into a shallow collector channel 62 with the outer end of said valve sleeve formed with a reduced diameter portion 63 to provide an external circular abutment or shoulder 64 normally engaging said inturned flange 13 to define the normal "off" position of said valve sleeve. In circular alignment with said collector channel 62 is another collector channel 65 formed in the inner cylindrical surface of the sleeve bore 55, and interconnecting said channels is a plurality of radial passageways 66 through the wall of the valve sleeve forming the bottom common to both of said collector channels. It should be importantly noted that the collector channel 62 is in continuous communication with the outlet port 50 in the power cylinder whereby seepage fluid under pressure from the power chamber 47 and/or the annular valve chamber 38, is trapped and returned to the reservoir 41 via the return line 45. The outlet passageway 48 is formed in a depending angularly disposed boss 68 integral with the exterior of said power cylinder casing, and which interconnects the horizontal passageway 51 with the return line 45 as shown. The inlet passageway 39 is formed in a similar angularly disposed boss 69 integral with the power cylinder casing, said bosses projecting forwardly and downwardly from the underside of the power cylinder casing as shown, to facilitate their connection to the pump HP and accommodate relative movement as well due to the interconnecting conduits being flexible. A pair of circularly aligned outer and inner annular grooves 71, 72 are provided in the fluid-retaining flange 37 and sleeve bore 55 respectively, said grooves being spaced rearwardly from said collector channels as shown in FIGURE 4. These two grooves are fitted with commercial O-rings which are subjected to slight radial compression when installed to prevent any seepage from the collector channel reaching the exterior of the motor HM via the mating cylindrical surface sealed by said O-rings.

A stationary piston or plunger unit "PU" is fixed at its rear end to a vertically disposed end web 75 of a mounting bracket generally designated "BR," said bracket having a U-shaped configuration horizontally disposed and includes a pair of side segments 76, 77 interconnected at right angles to said web, a pair of upper outstanding lateral flanges 78, 79, respectively, which terminate the upper forward ends of said side segments, and a pair of lower inturned flanges 81, 82 which terminate a forwardly offset portion 83 positioned below the forward ends of said side segments, respectively. The offset portion 83 is provided with an opening 84 through which the forward portion of the power cylinder 10 may freely pass, and the bottom ends of said side segments terminate in V-shaped contours, and a pair of aligned holes 85, 86 is provided through the V-shaped portions adjacent the apexes 87 of the side segments 76, 77, respectively. Mounting of the piston unit PU on the end web aforesaid is effected by a cap screw 88 passing through a hole 89 in the end web into tightly threaded engagement with a threaded blind bore 91 in the rear end portion of the piston unit. The free end of the piston unit is adapted to project into the longitudinal bore 55 in the valve sleeve, and thereby serves to slidably support the valve sleeve and power cylinder 10 for relative actuation with respect thereto as shown. The piston unit PU comprises: a headland 92 and a bearing land 93 longitudinally spaced to define an annular hydraulic collector chamber 94 therebetween, the forward end of the headland being provided with an expansible cup-shaped sealing member 95, and adjacent the forward end of the bearing land, an annular groove 96 fitted with a pliant O-ring seal 97 serves to prevent seepage of hydraulic fluid from the hydraulic chamber 94 to the exterior of said valve sleeve and piston unit. Slidably mounted on the piston unit PU is an actuating sleeve 98 for the valve sleeve aforesaid, and which continuously engages the end portion 63 whereby movements of the collar impart like movements to the valve sleeve. The sleeve 98 terminates at its forward end in an outstanding circular flange 99 which is normally spaced predeterminately from the rear end of the power cylinder 10 to provide the necessary relative operating movement or displacement for the valve sleeve shown at 101, said actuating sleeve being effective to engage the rear end of the power cylinder 10 upon such relative operating movement being fully taken up at which the valve sleeve is in full operating "on" position, to enable "straight-through" operation of said power cylinder and connected master cylinder piston of the conventional master cylinder generally designated "MC," the latter being illustrated by way of example in operative association with the disclosed hydraulic motor HM, said "straight-through" operation of the master cylinder being effected by operator force assisted by said motor or independently thereof. An annular channel 102 is provided in the outer cylindrical surface of the flange 99 to receive one end of a flexible dust excluding boot "B."

Pivotally mounted on a shaft 103 supported at its extremities in holes 85, 86, respectively, in the bracket BR, is a pair of spaced upstanding actuating arms 104, 105 which have their forward faces on their upper ends arcuately formed to bear against the outer face of said collar 98 to actuate the latter, and thereby actuate the valve sleeve in unison therewith. Intermediately disposed in the said actuating arms, is a pair of aligned holes 106, 107 adapted to receive a cross pin 108 to pivotally connect the forward end of a link 109 thereto, which in turn is pivotally connected at its opposite end to an operator-operated member shown herein as a brake-pedal "P."

The bracket BR is suitably mounted, preferably on the engine side of the vehicle firewall "FW," by bolts 111, or otherwise, which project through holes 112 through the firewall, said latter holes being aligned with those in a pair of lateral flanges 113, 114 which terminate the lower rear ends of the side segments 76, 77 aforesaid, said latter flanges being disposed in the same plane as the end web 75 as shown.

Projecting rearwardly from the exterior of the power cylinder 10, and preferably integral therewith, is an upstanding angularly disposed work-transmitting projection disclosed herein as an extension 115. This extension terminates at its free end into a vertically disposed portion 116 which is provided with a horizontal hole 117 therethrough, said portion being disposed normal to the axis of the power cylinder.

The power cylinder 10 is operatively associated with the aforesaid hydraulic brake master cylinder MC to actuate the same. This master cylinder is preferably of conventional construction and operation, and, as shown in FIGURE 1, is preferably positioned above the power cylinder in partially overlapping relationship thereto which provides the advantage of reducing the overall length of the assembly such that installation on the vehicle firewall can be made notwithstanding the limited space provided in this area on present-day motor vehicles. An integral mounting flange 121 is provided on the rear of the master cylinder body 122, said flange being provided with holes 123 which register with a corresponding number of aligned holes through an adapter plate 124 and the flanges 78, 79. These registering holes receive bolts 125 to produce a unitary assembly of the master cylinder and bracket BR. The piston 126 of the master cylinder is coaxially positioned with respect to the hole 117 in the pressure-transmitting extension or arm 115. Operably disposed in the pressure-corking chamber 128 is the piston 126, said piston being normally spaced from the forward end wall 129 of said chamber 128. A discharge outlet 130 is provided through said end wall, and the rear of the piston is adapted to engage in its normal disposition, a backing washer 131 stabilized to prevent fortuitous displacement thereof by a retaining ring 132 engaging an internal annular groove 133 adjacent the open end of the bore 134 in which said piston is reciprocably operated to pressurize and release the fluid in said working chamber as is understood. A fluid reservoir 135 is provided in the body of said master cylinder, said reservoir fluid being connected to the bore 134 via an intake port 136 and a compensating port 137, the former port being effective to supply fluid to the brake system "BS" schematically depicted in FIGURE 1, to prevent cavitation during release of said brakes, while the latter port is effective upon operating the master cylinder piston 126 to normally retracted position to enable further adjustments in the volume of fluid in the brake system to normally filled status, particularly is this true of the fluid in the working chamber to insure that this chamber is filled when the vehicle brakes are in fully released condition in readiness for another brake-applying cycle. The discharge outlet is provided with the usual residual pressure check-valve "RV" which functions in conventional manner to trap fluid in the brake lines or system under a predetermined minimal pressure, and to enable the fluid under pressure to be discharged into the brake lines and wheel cylinders to apply the brakes as is understood. A normally preloaded compression spring 138 is operatively disposed in the working chamber and reacts between the said residual check-valve and a spring seat 139 to maintain flexible cup-like seal 140 against the forward end of the piston 126, to continuously urge the piston toward its normal disposition and control operation of the residual check-valve.

Projecting rearwardly from the master cylinder piston 126 is a push-rod 141, the free end of which has a reduced diameter terminating portion 142 provided with threads which extend through the hole 117 in the upper end of the pressure-transmitting arm 115, and a nut 143 is threaded onto said portion 142 to attach the push-rod to said arm for actuation thereby, and in turn correspondingly actuate the master cylinder piston 126 engaged by the forward (opposite) end of said push-rod.

A hub-like extension 144 integrally projects from the mounting flange 121 through a suitable cutout 145 (see FIGURES 1 and 3) in the bottom edge of the adapter plate 124, in encircling relationship with respect to the open end of the master cylinder bore 134. Adjacent the outer end of this hub is an external annular groove 146 which receives the forward end of a flexible dust excluding boot "B1" which encircles the portion of the push-rod 141 adjacent said hub and snugly engages its rear end about the push-rod to prevent foreign matter from reaching the operating parts within the master cylinder bore 134.

An external annular groove 149 is provided in the power cylinder casing 10 between the integrated end of the pressure-transmitting arm 115 and the rear end of said casing. This groove receives the forward end of the previously mentioned boot B to isolate the rear end of the valve sleeve 35 and open end of said casing from foreign matter, etc., that might enter to cause malfunctioning of said valve sleeve and excessive wear to shorten its normal service life.

A guide support member disclosed herein as an elongated rod 151, is provided on opposite sides of said power cylinder casing in parallelly spaced relationship to the axis thereof, to maintain axial reciprocation thereof on the stationary piston unit PU, thereby insuring against any deflection from the true straight path of motion of said power cylinder. The forward ends of said guide rods 151 are rigidly attached as shown to the pair of inturned flanges 81, 82, respectively, said rods extending rearwardly therefrom into holes 152 through the end web 75 of the bracket BR to thus support the rear free ends thereof.

A pair of lateral projections 153 extends from opposite sides of the power cylinder casing 10 in diametrically disposed relationship with respect to each other, said projections being longitudinally positioned on the casing 10 in circular alignment substantially with the integrated end of the pressure-transmitting arm 115. Each of the free ends of each of these projections terminates in a bifurcated construction formed by a horizontal cross slot 154, the width of which corresponds substantially to the diameter of said guide rod, and through which said rods forwardly project, respectively, with the forward end portions thereof passing through guide holes 155 in the flanges 81, 82 as shown in FIGURES 2 and 3, to slidably support the power cylinder casing 10 thereon as shown thereby minimizing the supporting function of said stationary piston unit PU for said casing.

Since the hydraulic motor HM is obviously adaptable to operate devices other than the illustrated master cylinder MC, it is desired to incorporate in this specification terminology for the master cylinder piston 126 which is broadly descriptive thereof in a patent sense. Therefore, since the referred to piston performs work, use of the expression "work-performing element" may be resorted to in certain claim or claims.

*Operation*

The parts normally occupy the positions shown in FIGURES 1 and 4. Under such conditions fluid from the pump HP is conveyed under pressure in accordance with the setting of the pressure regulator valve PRV through the pressure line 40 into the chamber 38, while the power chamber 47 is maintained filled with fluid at a predetermined minimal (non-activating) pressure by the check-valve CV³ interposed in the return line 45. Any excess pressures within the chamber 38 are relieved by the pressure regulator valve PRV so that substantially stabilized working pressure on the fluid in chamber 38 is maintained. Also it should be observed that any leak-by (seepage) fluid which may escape from the collector chamber 94 on the piston unit PU past the O-ring seal 97, or from the pressure chamber 38 past the piston ring 61 on the sleeve valve element 35, is trapped by the two collector channels 62, 65 interconnected by the radial passageways 66, and returned to the pump sump 41 via the port 50, passageway 51, outlet passage 48 to the return line and thence into the pump sump. The working land 36 on the valve element 35 is fitted in close tolerance relationship with respect to the working surfaces in the closure head 11 and power cylinder casing 10, to minimize loss of fluid from the pressure chamber 38 when the latter is isolated from the power chamber 47, but, should minute quantities of fluid escape past the working land aforesaid, this would enter the power chamber 47 and return to the pump sump 41 via the surface channels 28, radial passageways 29, groove 22, port 49, outlet passageway 48 to the return line 45 via the check-valve CK³ back into the pump sump 41 for recirculation by said pump HP. It is therefore seen that the pressure and return hydraulic lines or circuits are maintained inactive in the manner above described to induce and maintain the inactivated status of the hydraulic booster motor HM.

When it is desired to apply the vehicle brakes, the pedal P is depressed, thus actuating the valve sleeve 35 to the left of its normal position shown in FIGURE 2, relatively to the power cylinder 10 and to the piston unit PU. Initial movement of the valve sleeve displaces its working land 36 to a position whereat it still overlies control channel 33 but the radial passageways 29 now isolated from the power chamber 47 to condition the latter to expand and thereby separate the piston unit PU and power cylinder 10 for power-activation of the motor HM. The aforesaid overlapping disposition of the valve working land with respect to the control channel 33 with the radial passageways closed may be termed what is known in the art as the "lapped" position of the valve sleeve 35 in which the vehicle brakes are held "on" at any given applied position thereof by halting pedal movement at that point of brake application, since the valve sleeve 35 and power cylinder 10 have the usual follow-up control action in which the power cylinder overtakes the sleeve valve position at any activated position of the power cylinder in response to holding the pedal P substantially at that position. If additional brake pressure is required from the halted position of the pedal, the operator merely applies more pressure to the pedal to effect further movement of the valve sleeve 35 which induces additional expansion of the power chamber 47 to thus effect more braking pressure at the vehicle wheel cylinders as is understood.

The phases of the brake operating cycle just described, are termed in the art as the "applied" and "holding" positions respectively, the latter phase being effective to hold the brakes "on" at any applied position thereof as above explained.

Movement of the power cylinder 10 to the left from its normal position shown in FIGURES 1 and 2, effects a corresponding movement of the master cylinder piston 126 to displace fluid in the usual manner into the brake lines. Part of the work of applying the brakes is performed by the motor HM and part by the valve sleeve under influence of the pedal P, operation of the latter being effected by operator force, and since reaction "feel" is present in the brake-pedal from the master cylinder piston 126 and from the hydraulic working pressures in the expansible power chamber 47 reacting on the circular reaction surface terminating the inner end of the working land 36 of the valve sleeve, the operator is apprised at all times of the amount of braking force in effect. The aforesaid reaction surface is continuously subjected to hydraulic working pressures aforesaid during activated status of the motor HM, and such working pressure are proportional to the total effective pressure in said power chamber 47. Supplementing this hydraulic reaction on the valve sleeve 35 is the diminutive reactive force produced by the valve sleeve return spring 59. Thus, the present novel booster motor provides reaction "feel" control effective on the operator-operated member (brake-pedal), to enable the operator to smoothly control energization of the motor HM to operate the master cylinder MC.

The collar 98 which engages the right end of the valve sleeve 35 to actuate the same, is normally spaced from the confronting end of the power cylinder casing as shown in FIGURE 2 to provide the required relative operating movement of the valve sleeve. When such relative movement has been fully taken up wherein the valve sleeve is actuated to full "open" position, the collar is brought into contact with the confronting end of the power cylinder casing whereby operator effort applied through the brake-pedal to the collar is effective directly on the power cylinder casing 10 for actuation thereby, to either assist the power cylinder in applying the brakes, or to enable operator actuation of the brakes in the event the motor HM becomes inoperative for any reason. The present booster mechanism, therefore, provides automatic operator participation in the application of the brakes without interference from the motor HM if conditions require.

Movement of the parts in a retractile operation thereof upon release of the brake-pedal will be apparent from the disclosure. The spring 59 will return the valve sleeve 35 to its normal position as shown in FIGURE 4, while the combined reactions from the master cylinder piston return spring 138, and wheel cylinder return springs transmitted through the column of brake fluid in the brake lines, will return the power cylinder 10 to its normal position along with the normalizing of the valve sleeve. The normal disposition of the power cylinder and valve sleeve being defined by the engaged ends of the valve sleeve actuating arms 104, 105, the righthand edges of which engage the end web 75 of the bracket BR. Thus the operating parts are established in their respective normally released positions wherein the vehicle brakes are "off" to complete the aforesaid brake operating cycle in readiness for another similar cycle.

It is important to point out here that the operativeness of the hydraulic motor HM can depend on the presence of a work-load such as the master cylinder MC to develop an increasing resistance to oppose valve sleeve actuation by the operator, or the valve sleeve spring may be installed weaker than the master cylinder piston return spring 138, to enable the motor HM to become energized in response to brake-pedal movement alone. The former operational sequence is particularly true where the preloaded status of the valve return spring 59 exceeds that of the master cylinder piston return spring 138 subsequently supplemented by initial hydraulic reaction on the master cylinder piston 126 induced by increased operator force following initial operator force as a function of the force transmitting capacity of the valve return spring 59 in substantially preloaded condition. Upon such resistance buildup reaching such an intensity so as to overcome the valve return spring spring 59 causing the latter spring to yield, relative displacement of the valve sleeve 35 to operating "on" position accompanies such yielding action of the spring 59 and thereby induces operative energization of the motor HM in the manner previously explained. However, if the valve return spring 59 is of less preloaded strength than the master cylinder piston return spring 138 and/or wheel cylinder return springs, then initial operator force applied to the valve sleeve 59 would displace it relatively to the power cylinder and piston unit PU, to activate the motor HM prior to initial operation of the master cylinder MC by said motor in part. This latter sequence of motor and master cylinder operation, is especially suited to low-pedal control wherein the foot pad is normally located substantially in the same plane as the accelerator pedal, with considerable sacrifice of mechanical advantage between the pedal and master cylinder piston 126 to render direct application of the vehicle brakes extremely burdensome to the driver in the event of power failure, but in the former sequence wherein the valve return spring 59 exceeds the strengths of the springs 138 and/or wheel cylinder return springs, to enable unison movement of the valve sleeve, power cylinder 10 and master cylinder piston 126 as a unit under influence of initial operator-actuation, the compensating port 137 is closed to condition the master cylinder MC to pressurize the brake fluid, prior to operative energization of the motor HM whereby smooth brake-applying operation ensues, since the whole hydraulic system is in readiness to apply pressure to the brake shoes already disposed in slipping engagement with their respective brake drums. Stated differently, the "slack" in the system has been removed before assist from the motor HM becomes effective. As explained in connection with the sequence wherein the motor HM is first energized and the compensating port 137 closed thereby, there is a tendency for the motor to become energized too suddenly since only the master cylinder piston and wheel cylinder return springs oppose such initial activation which enables the motor HM to operate through somewhat short idle travel before the master cylinder becomes conditioned (closure of the compensating port 137) to pressurize the brake fluid and thereby establish resistance to movement of the motor power cylinder 10. Therefore, the present booster apparatus provides two sequences for conditioning the master cylinder MC to pressurize the brake fluid; namely, (1) by closing the compensating port 137 by initial operator force prior to operative energization of the motor HM, and (2) by closing the compensating port 137 by initial operation of the motor HM following initial relative operation of the valve sleeve 35 by operator force.

Assuming there is a failure in the pump HP to produce pressure, and the operator desires to apply the brakes which, in such case, the pedal P would be depressed in the usual manner and the pedal-actuated parts would move in unison therewith to the left from their normally retracted positions shown in FIGURES 1 and 4, but when the collar 98 reaches the limit of its relative axial movement defined by engagement with the confronting end of the power cylinder 10, at which all of the relative operating movement of the valve sleeve 35 has been taken up in a motor-energizing direction of control. Therefore, upon additional pressure being applied to the brake-pedal P, the collar 98, valve sleeve 35 and power cylinder 10 would move as a unit thereby transmitting operator force via the extension 115 to the master cylinder piston push-rod 141 to activate said piston in a brake-applying direction by operator force alone.

Whereas, in prior art constructions, brake applications, upon failure of the power booster unit, or an assist required therefor following power-run-out, was accomplished by transmitting operator effort through the movable power assembly of such units, while the piston unit PU in the present invention is stationary at all times, only the power cylinder being movable to activate the master cylinder MC.

The nature of the present invention obviously discloses that the power cylinder 10 or piston unit PU operable therein may be the stationary component, or both components movable relatively to each other as would be the case were the present motor HM utilized in an application requiring movement of two components toward and away from each other. Accordingly, either of the two principal components comprising the present hydraulic motor HM, may be utilized to activate and inactivate a connected device, and the invention contemplates such variations of application according to commercial design.

It is further obvious from the disclosure that the extension 115 may project coaxially from the closure head 11 of the power cylinder into the master cylinder piston in tandem relationship to actuate said piston, and thereby replace the master cylinder push-rod 141 to produce a unitary assembly of the master cylinder MC and power cylinder 10. As previously pointed out, a more compact assembly results from these two major components when disposed in the illustrated overlapping arrangement.

In summary, my novel and improved booster motor HM herein disclosed, is of simple and economical construction capable of quick and easy assembly and disassembly, and the apparatus operates with a high degree of efficiency and dependability in a wide range of applications, particularly as a booster control for vehicle brakes and steering systems wherein a degree of operator control is necessarily retained for reaction "feel" of the brake pressure or road reaction respectively to enhance the control as well as serve to safeguard against possible power failure, such advantages being provided with considerable reduction in operator effort from that required when such systems are operated solely by operator force effort.

Reference is now made to the terminology used in the foregoing description and in the appended claims in which the identifying expressions and/or terms employed are intended to convey meanings which include the range of reasonable equivalents in a patent sense. For example, the expressions, "motor," "booster," "booster motor," "hydraulic motor," "power cylinder" or "casing," "hydraulic cylinder," "power-booster," "booster mechanism" or "apparatus," are intended to include any casing and/or chamber having a pressure-responsive movable assembly therein, whether such assembly and casing are relatively movable with respect to each other, or one or the other of said components having a stationary relationship with respect to the other. The terms "forward," "rear," "bottom," "top," "right," "left," "horizontal," "vertical," and other directional words or characters are intended to have only relative connotation for convenience in describing the structure as illustrated on the drawing, and are not intended to be interpreted as requiring any particular orientation with respect to the associated structure external to the disclosure or to the operating position thereof.

It is to be understood that the form of the invention illustrated and described is to be construed as a preferred embodiment of the same, and that the scope of the invention is defined in the subjoined claims.

Having thus described my invention, I claim:

1. In a hydraulic motor comprising: a stationary piston unit; a tubular valve element slidably disposed on said piston unit for relative sliding movement thereto; a movable power cylinder open at one end and closed at the other, and in which, said valve element is relatively slidable; an element movable to perform work; an annular hydraulic pressure chamber encircling the exterior of said valve element; a source of hydraulic pressure communicating with said pressure chamber; a hydraulic fluid reservoir adapted to supply said source of hydraulic pressure; a return line connected to said reservoir; an expansible hydraulic working chamber disposed between said closed end of the power cylinder and the confronting end of said piston unit; a pair of longitudinally spaced annular lands on said valve element to define said pressure chamber; an annular hydraulic control channel incorporated in the interior of said power cylinder ahead of the confronting end aforesaid of the piston unit, said control channel being controlled by one of said valve lands to selectively isolate the pressure chamber from said working chamber in normal disposition of said valve element, and relatively displaceable to operating position to place the latter chamber in communication with said pressure chamber to inactivate and activate, respectively, said motor; passageway means incorporated in the interior of said power cylinder adjacent the closed end thereof, for connecting said working chamber to an outlet passageway leading to said return line when the power cylinder is in normal disposition; a one-way check-valve operatively interposed in said return line to accommodate fluid flow to said reservoir to produce a non-activating minimum pressure in said working chamber; a normally preloaded spring operatively disposed in said working chamber between the closed end of the power cylinder and the confronting end of said valve element for biasing them to their respective normal positions; limiting means including abutment-engaging portions incorporated on said power cylinder and said valve element, respectively, to define the normal disposition thereof; and an operator-operated member having a normally released position for displacing said valve element to operating position wherein the latter element is engageable with said power cylinder to enable operator-actuation of said cylinder directly to assist power cylinder actuation.

2. In a hydraulic motor comprising: a telescopically-related relatively movable power cylinder and tubular valve element; a piston unit having an end portion operably projecting into said valve element; an element adapted to perform work, said work element being actuated in part by said power cylinder; a source of hydraulic pressure having a pressure line and a return line; an expansible working chamber having a normal size between one end of said power cylinder and the piston unit end portion projecting into said valve element, said working chamber being connected to said return line; a one-way check valve interposed in said return line to establish a predetermined minimum pressure in said expansible chamber when normal; an annular pressure chamber encircling said valve element and connected to said pressure line; a working and a spaced bearing land on said valve element defining said annular pressure chamber; an internal control channel incorporated in said power cylinder ahead of the piston unit end portion projecting into said valve element and normally isolated from said pressure chamber, said channel being controlled by said working land to selectively isolate the return line from said channel and connect the latter to said expansible chamber for power-activation of said power cylinder, and to isolate said channel from said pressure chamber and connect said expansible chamber to the return line for power-inactivation of said power cylinder; a normally preloaded spring reacting between said one end of the power cylinder and the valve element to bias them apart to their normal disposition; limiting means including cooperating abutment-engaging portions incorporated by said power cylinder and valve element, respectively, to define their normal disposition; hydraulic reaction means defined by an annular face portion on the inner end of said working land exposed to said expansible chamber; and an operator-operated member having a normally released position for actuating said valve element relatively to said power cylinder and piston unit in opposition to said spring to place the said control channel in communication with said pressure chamber and to isolate said return line from said expansible chamber for power-activation of said motor.

3. In a hydraulic motor having a fluid supply reservoir, comprising: a pair of telescopically-related power units relatively displaceable from normal position to produce thrust for power-activation of said motor; an element movable to perform work, said element being actuatable in part by said power-thrust; a control valve having a movable element provided with a control portion relatively movable between said power units to control power-activation and inactivation of said motor; and expansible power chamber between said power units to effect relative displacement thereof; a source of hydraulic pressure production communicating with said control portion on the valve element for selective connection to said power chamber to expand the same, and for disconnection therefrom wherein said power chamber is connected to said supply reservoir for power-inactivation of said motor; a reactive portion on said valve element exposed to pressure conditions within said power chamber to oppose relative movement of said valve element during power-activation of said motor; a normally preloaded spring operatively disposed between said valve element and one of said power units to bias them apart to normal position; limiting means including cooperating abutment-engaging portions operably incorporated on said one power unit and the said valve element, respectively, to define their normal position; a device to be operated by said motor and operatively connected via said work element to one of said power units, said device including a normally preloaded spring adapted to oppose power-activation of said motor; an operator-operated member having a normally released position for actuating said valve element in a motor-activating direction in opposition to the combined reactive forces imparted by said first-mentioned spring and hydraulic reaction effective on the reactive portion of the valve element; and stop means for defining the normal position of said one power unit under influence of the last-mentioned spring.

4. In a booster brake mechanism comprising a motor provided with a pressure-responsive cylinder having one end open and a stationary piston projecting through said open end into said cylinder, a detachable head closing the other end of said cylinder, an element movable to perform work, said element being activatable in part by said pressure-responsive cylinder; an expansible power chamber between the closed end of said cylinder and said piston to separate them and thereby produce thrust; an internal pressure distributing annular channel defined by an internal annular shoulder in said cylinder spaced from said detachable head; a plurality of longitudinal passageways radially spaced from the axis of said cylinder to interconnect said distributing channel and said power chamber; an annular channel between said detachable head and said cylinder; a plurality of radial passageways in circular alignment with said last-mentioned annular channel to interconnect the same with said power chamber; an outlet port in said cylinder leading to the exterior thereof, in communication with said last-mentioned annular channel; a control valve having an element movably disposed between said cylinder and piston to selectively control said distributing channel and said radial ports in the detachable head; an annular pressure chamber between said valve element and the cylinder; an inlet port in said cylinder leading to the interior thereof in communication with said pressure chamber; a source of hydraulic pressure production having a pressure line and a return line, said pressure line leading to said inlet port, and said return line leading to said outlet port; a normally preloaded spring reacting between said cylinder and valve element to separate them to normal position; limiting means including cooperating abutment-engaging portions carried by said cylinder and valve element, respectively, to define their normal disposition; stop means for defining the normal position of said cylinder; operator-operated means to effect relative displacement of said valve element in a motor-activating direction; and means effective between said operator-operated means and said cylinder for directly moving the latter after full relative displacement thereof has been effected.

5. In a hydraulic motor comprising: a movable power cylinder having one end closed and the other end open; an element movable to perform work, said element being movable in part by said power cylinder; a counterbore at the closed end of said cylinder terminating in an internally threaded portion; an inturned circular flange terminating the open end of said cylinder; a longitudinal bore extending from said counterbore to said inturned flange; an internal annular shoulder defined by the juncture of said counterbore and longitudinal bore; a removable head plug provided with an outwardly flanged external portion, an externally threaded medial portion and a smooth reduced diameter inner terminating portion, said smooth portion having a pair of longitudinally spaced annular grooves, the innermost of which is equipped with a resilient packing to effect a fluid-tight seal between the plug and cylinder when the plug is installed in threaded engagement with said internal threads in the power cylinder to close the one end thereof; a longitudinal bore in the plug coaxial with and of the same diameter as the first-mentioned longitudinal bore; a blind counterbore in the plug coaxial with said longitudinal bore therein; an internal annular fluid control channel in the cylinder defined by a predetermined space obtaining between the inner end of said smooth portion on the plug and the confronting shoulder aforesaid; a variable volume power chamber defined by the bores in said plug; a plurality of longitudinal surface channels in the cylindrical surface of the counterbore in said plug for interconnecting said power chamber with said control channel; a plurality of radial ports through the wall of the other groove in the plug for interconnecting the said power chamber with said latter groove; an outlet port in the cylinder communicating with said other groove; a stationary piston unit projecting into said cylinder in circularly spaced relationship therefrom, and which defines one end of said power chamber; a cylindrical tubular valve element slidably disposed in the circular space aforesaid between said piston unit and coaxial longitudinal and counterbores in the cylinder and plug, respectively, said valve element having relative sliding movement in close tolerance relationship with respect to both the piston unit and cylinder; cooperating abutment-engaging elements carried by said power cylinder and valve element, respectively, to define the relative sliding movement of said valve element; an annular pressure chamber encircling said valve element; a forward working land and a longitudinally spaced fluid-retaining flange on said valve element defining said pressure chamber, said working land normally overlying said control channel and spaced to one side of said radial ports in the plug to isolate the pressure chamber from the power chamber, and to connect the latter chamber to said radial ports to exhaust fluid from said power chamber thus restoring the latter to normal size wherein the motor is inactivated; an external annular channel in the bearing land of the valve element adjacent the end of the pressure chamber opposite the working land thereof; an expansible seal engaging said last-mentioned channel to effect fluid-tight seal between the fluid-retaining flange and interior cylindrical surface of the valve element; a fluid collector channel indented in said fluid-retaining flange merging with said last-mentioned channel; a plurality of radial ports through said fluid-retaining flange of the valve element for interconnecting said collector channel with the interior of said valve element; an annular seepage collector chamber encircling that portion of the piston unit which projects into said valve element; an outlet port in the cylinder in circular alignment with said collector channel; a horizontal passageway interconnecting the two outlet ports in the cylinder; an outlet passageway in the cylinder connecting said horizontal passageway to the exterior of said cylinder; a headland terminating the inner end of said piston unit, said headland being longitudinally spaced from an elongated bearing land which terminates the outer end of said piston unit, said last-named lands defining the seepage collector chamber aforesaid; an external annular groove in the bearing land adjacent the end of said seepage collector chamber opposite said headland; a packing in said last-mentioned groove to effect a fluid-tight seal between the interior of said valve element and the outer bearing surface on said piston unit; a reduced diameter terminating portion at the end of the valve element opposite its working land for defining an external shoulder with the normal diameter of said element, and which engages the inner side of said inturned flange at the open end of the cylinder to define the normal position of said element; a normally preloaded spring reacting between the bottom of the counterbore in said plug and the working land on the valve element in separate the cylinder and element to their respective normal positions; a thrust-collar slidably mounted on an external portion of said bearing land of the piston unit and adapted to engage the reduced end of the valve element which normally projects predeterminately beyond the open end of said cylinder to define the relative sliding movement of the valve element with respect to the cylinder when the valve element is actuated in unison with said collar in opposition to the valve spring aforesaid; an inlet passageway in said cylinder communicating with said pressure chamber on the valve element; operator-operated mechanism for actuating said collar to control the valve element in the manner described, said collar being engageable with the valve element confronting end of said cylinder when the full relative sliding movement therebetween has been taken up, to directly actuate said cylinder by operator effort; stop means including a pair of cooperating abutment-engaging portions operably effective between a portion associated with said piston unit, and said operator mechanism for defining the normal position of the latter; and a fluid source selectively communicable with said inlet and outlet passageways in said power cylinder to control said motor.

References Cited by the Examiner
UNITED STATES PATENTS

| | | | |
|---|---|---|---|
| 2,119,650 | 6/38 | Rossmann | 91—216 |
| 2,769,502 | 11/56 | Ziskal | 91—216 |
| 2,827,974 | 3/58 | Frank | 91—216 |
| 2,968,316 | 1/61 | Shultz | 91—434 |
| 3,070,960 | 1/63 | Ternent | 91—216 |

FRED E. ENGELTHALER, *Primary Examiner.*

SAMUEL LEVINE, *Examiner.*